No. 811,588. PATENTED FEB. 6, 1906.
H. SCHNEIDER.
AUTOMATIC GAS CONTROLLING DEVICE.
APPLICATION FILED SEPT. 11, 1905.
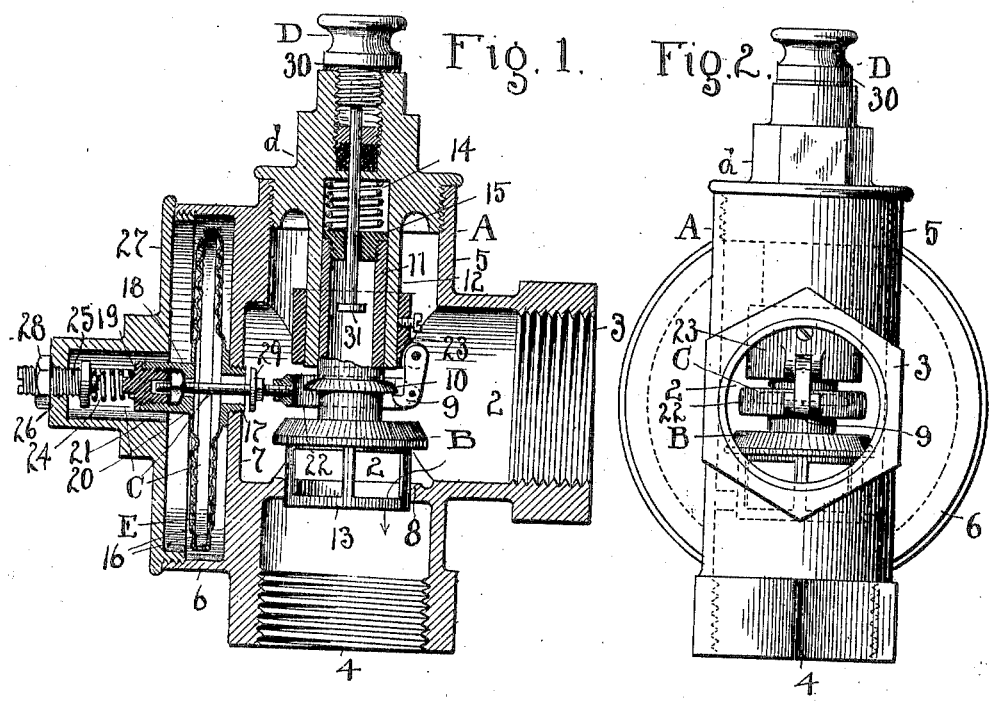
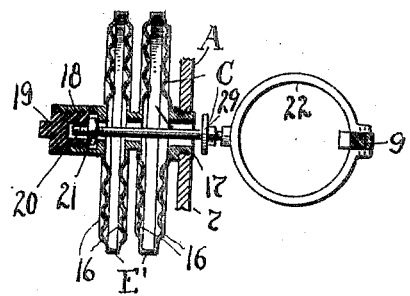
ATTEST.
INVENTOR.
Hugo Schneider
BY H. J. Fisher ATTY.

UNITED STATES PATENT OFFICE.

HUGO SCHNEIDER, OF CLEVELAND, OHIO.

AUTOMATIC GAS-CONTROLLING DEVICE.

No. 811,588.　　　　　Specification of Letters Patent.　　　　　Patented Feb. 6, 1906.

Application filed September 11, 1905. Serial No. 277,822.

*To all whom it may concern:*

Be it known that I, HUGO SCHNEIDER, a citizen of the United States, residing at Cleveland, in the county of Cuyahoga and State of Ohio, have invented certain new and useful Improvements in Automatic Gas-Controlling Devices; and I do declare that the following is a full, clear, and exact description of the invention, which will enable others skilled in the art to which it appertains to make and use the same.

My invention relates to improvements in automatic gas-controlling devices; and the improvement consists in the construction and combination of parts substantially as hereinafter shown and described, and more particularly pointed out in the claims.

The object of the invention in the form herein shown and described is to provide automatic means to cut off the flow of gas when for any reason the pressure falls so low that there is danger of extinguishment of the flame at the burner and consequent escape of the gas thereafter unless it be cut off. Such a device must be reliable in operation at all times and adapted to do its work without requiring frequent inspection. To this end the construction must be both sensitive and durable and also made up of materials which will not undergo deterioration or change through the chemical actions of the gases.

In the accompanying drawings, Figure 1 is a central sectional view of my improved cut-off device with the parts in their relative positions as in use and when under pressure from the gas-main. Fig. 2 is an elevation of the device as viewed from the right of Fig. 1. Fig. 3 is a sectional view of a pair of expanding gas-drums with a plan view of the catch mechanism connected therewith.

Broadly stated, the device comprises body or casing A and a valve B therein adapted to close the main gas-passage 2, combined with valve-controlling mechanism C, adapted to hold valve B open when the gas-pressure is normal. A resetting or lift device D is used to restore the valve to its open position.

In detail body A has a gas-inlet 3 and gas-outlet 4 arranged at right angles with a tubular extension 5 opposite outlet 4 and a circular chamber 6 axially in line with inlet 3 and upon the opposite side of the body and separated therefrom by wall 7. Valve B is adapted to rest down upon seat 8 within body A to close passage 2, but is normally held in raised and open position by means of the controlling mechanism C, which has a catch 9 engaged beneath an annular rib 10 on hollow stem 11 on valve B. A cap-nut $d$, threaded within extension 5, has a depending tubular portion 12, within which stem 11 is free to slide and whereby the valve is held in axial alinement with its seat 8. An open circular apron 13 is further provided as a guide for valve B at its seat 8. A coiled spring 14 within portion 12 bears down upon a nut 15, threaded upon the upper end of stem 11, and serves to carry and hold valve B down upon its seat when catch 9 is released from engagement with rib 10.

The valve-controlling mechanism is arranged to hold valve B raised and open during the flow of gases at certain pressures, as may be determined by adjusting suitable parts. Thus mechanism C comprises as its most essential element an expanding gas-confining drum E, which has yielding side walls 16, preferably disk-shaped and constructed of thin spring sheet metal and corrugated to more readily expand and contract. A tubular threaded extension 17 upon one of walls 16 is screwed within an opening in wall 7 and provides open communication with gas-passage 2, and the other side wall 16 is also provided with a threaded nipple or extension 18, which is closed at its outer end by plug 19. A rod 20, having a nut 21 secured within nipple 18 by plug 19, extends through drum E and extension 17 and is screwed to a yoke 22, which is in turn pivotally connected with the free end of catch 9. Said catch is pivotally suspended from ears on a sleeve 23, adapted to be adjusted higher or lower on its support 12.

The pressure of the gases entering drum E from passage 2 expands or distends walls 16, and as said drum is supported by and in fixed relation to wall 7 the pull upon rod 20 is outward to carry and hold catch 9 beneath rib 10. In the event of an interruption of the flow of gases or marked decrease in the pressure it is designed that catch 9 shall be released to permit valve B to close. The inward spring of walls 16 would return the parts in a measure to effect such release; but I do not rely on this means solely, and hence provide a coiled spring 24, which is held between plug 19 and an adjusting-screw 25, mounted in the hollow end 26 of cap 27. Said cap is screwed upon body A to close circular chamber 6 from the outside and to protect drum E. Screw 25 has a lock-nut 28, and by adjusting said parts more or less tension is brought to bear against plug 19 through spring 24. Thus screw 25 may be set to cause the release of catch 9 at different predetermined pressures. To guard against the dangerous effects of excessive pressures within drum E, I mount a cut-off disk or valve 29 on threaded rod 20 opposite the open end of extension 17 and which automatically closes the gas-inlet to drum E when the safe limit of expansion of walls 16 is reached.

Valve B is raised to its suspended position by means of resetting device D, consisting of thumb-nut 30 and its headed stem 31. Said stem is of sufficient length to permit free action of the valve when thumb-nut 30 is screwed into its seat within screw-cap d.

In Fig. 3 a pair of drums E' are shown as connected together and whereby greater expansiveness and spring action is obtained, the four walls 16 being cumulative in their effect.

The device may be inverted or placed on its side and operate as freely as in the position shown.

What I claim is—

1. In an automatic gas cut-off, a valve and valve-body, a gas-passage in said body, a catch for said valve, an expanding drum having open communication with said passage, operative connecting means for said drum and valve, and a valve adapted to cut off the flow of gas to said drum.

2. In an automatic gas cut-off, a valve-body and valve therein and an expanding drum open to the gas-pressure adapted to control the closing of said valve, and a supplemental valve connected with said drum adapted to close the gas-inlet of said drum.

3. In an automatic gas-controlling device, a valve-body and a main valve therein, a side chamber and an expanding drum therein having yielding side walls constructed of spring metal, in combination with means to hold the main valve open comprising a catch, operative releasing connections between said drum and said catch, and a valve in said connections to cut off the gas from said drum.

4. In an automatic gas cut-off, a valve-body and valve therein, in combination with an expanding drum and catch mechanism for said valve having connections united with the outer side of said drum, a spring adapted to bear against the drum, to release the catch mechanism, and an adjustable screw adapted to vary the tension of said spring for different gas-pressures acting upon said drum.

5. In an automatic gas cut-off, a body and gas-passage through the same, a main valve having a stem and an annular rib thereon, a guide for said stem and a sleeve on said guide, a catch suspended from said sleeve adapted to engage said rib, an expanding drum open to said gas-passage and operating connections with said catch, said connections united with one side of said drum and a spring behind said connections.

6. In an automatic gas cut-off, a hollow body and a valve therein having a tubular stem, a catch adapted to hold said valve open and a device adapted to carry said valve into engagement with said catch, a removable supporting and guiding cap for said valve and said device, means to release said catch and means to raise said valve to cause the same to reëngage with said catch comprising a rod engaged within the stem of said valve, a spring-pressed collar inside said stem adapted to be engaged by the lower end of said rod and a removable plug engaged with the upper end of said rod.

In testimony whereof I sign this specification in the presence of two witnesses.

HUGO SCHNEIDER.

Witnesses:
R. B. MOSER,
C. A. SELL.